Inventors
Julius Yarmak
Josef Synac
By Stevens Davis Miller & Mosher
Attorneys

July 23, 1963 J. YARMAK ET AL 3,098,359
REVERSIBLE HYDROSTATIC TORQUE CONVERTER
Filed July 3, 1961 3 Sheets-Sheet 3

Inventors
Julius Yarmak
Josef Synac
By Stevens Davis Miller & Mosher
Attorneys

United States Patent Office 3,098,359
Patented July 23, 1963

3,098,359
REVERSIBLE HYDROSTATIC TORQUE CONVERTER
Julius Yarmak, Swadlincote, and Josef Synac, Woodville, England, assignors to Coal Industry (Patents) Limited, London, England, a company of Great Britain
Filed July 3, 1961, Ser. No. 121,592
Claims priority, application Great Britain July 14, 1960
4 Claims. (Cl. 60—53)

This invention refers to a reversible hydrostatic torque converter or a reversible hydraulic power transmission comprising a hydraulic pump of an automatically adjustable displacement driven by a prime driver and delivering fluid under pressure to a hydraulic motor of a constant displacement adapted to drive an output shaft and a machine with self adjusting variable speed. Both the the pump and the motor are of reversible type, thus direction of rotation of the output shaft will reverse according to reversing of the prime mover rotation.

The displacement of the pump and thus speed of the output shaft are adjusted automatically and continuously in an inverse proportion to the torque or resistance of the output shaft.

According to one feature of the invention the displacement of the pump and speed of the output shaft remain at their maximum until a pre-determined minimum resistance of the output shaft is reached. Thereafter the displacement of the pump and speed of the output shaft will decrease as the resistance of the output shaft increases until the resistance reaches a predetermined maximum at which instant the output shaft ceases to rotate. The pump displacement or delivery at this instant will be reduced automatically so as to make up any leakages in the hydraulic system to maintain the maximum pressure in the system and the maximum torque on the output shaft. As soon as resistance on the output shaft drops below the maximum, rotation will commence again and speed will increase in proportion to reduction of the resistance.

An object of the invention is to provide a compact hydraulic torque converter of high efficiency requiring little cooling and capable of withstanding stalling conditions indefinitely without overheating.

Another object of the invention is to provide a reversible hydraulic torque converter capable of working equally well in both directions of rotation.

The reversible hydrostatic torque converter according to the invention is particularly suitable for application in various kinds of drives provided with squirrel cage type electric motors as prime mover which motors are reversible, having nearly constant speed characteristics which change very little with variation of load and could be controlled and reversed by remote control.

While any type of reversible hydraulic motor and pump of an infinitely adjustable capacity and high efficiency could be used in the reversible hydrostatic torque converter according to this invention, the balanced-type vane pumps and motors according to our co-pending application Serial No. 124,130, filed July 14, 1961, are the most suitable for the purpose.

In the attached drawing FIGURE 4 shows typical performance curves of a reversible hydrostatic torque converter according to the invention.

The torque multiplication ratio is shown having a value 2:1 and prime driver speed (speed of input shaft) variation is approximately 5% only. It may be seen on the diagram that difference between input and output power remains nearly constant and equal to about 10% of maximum input power. It may be stated here that the difference between input and output power in torque converters of any kind comprises of course lost power which is transmitted into heat. The heat generated must be removed by cooling to prevent danger of overheating.

In the case of the reversible hydrostatic torque converter the loss of power or heat power comprises not more than 10% of the maximum power in all conditions even when speed of output shaft is zero (stalling condition) as compared with 100% heat power for ordinary hydrokinetic torque converters in which (during stalled condition) the whole maximum power of prime driver is transmitted into heat. For the ordinary hydraulic coupling the lost power transferred into heat in the stalling condition may comprise about 200% of the nominal rated power. It is usual to provide up to 200% overload torque of the electric motor or nearly double power, all of which is transmitted into heat if there is no rotation of output shaft.

From the above figures the object of the invention to eliminate overheating may be readily appreciated. Although the reversible hydrostatic torque converter may be applied in many cases as mentioned above, the particularly suitable application is to provide an automatically variable reversible and remotely controlled drive for coal ploughs in coal mines.

Other features of the invention, will readily be understood from the detailed description of an example embodying the invention hereinafter described in which balanced-type vane pumps according to our co-pending application Serial No. 124,130, filed July 14, 1961 are used.

The detailed description is given hereafter with reference to the accompanying drawings in which.

Figure 1:
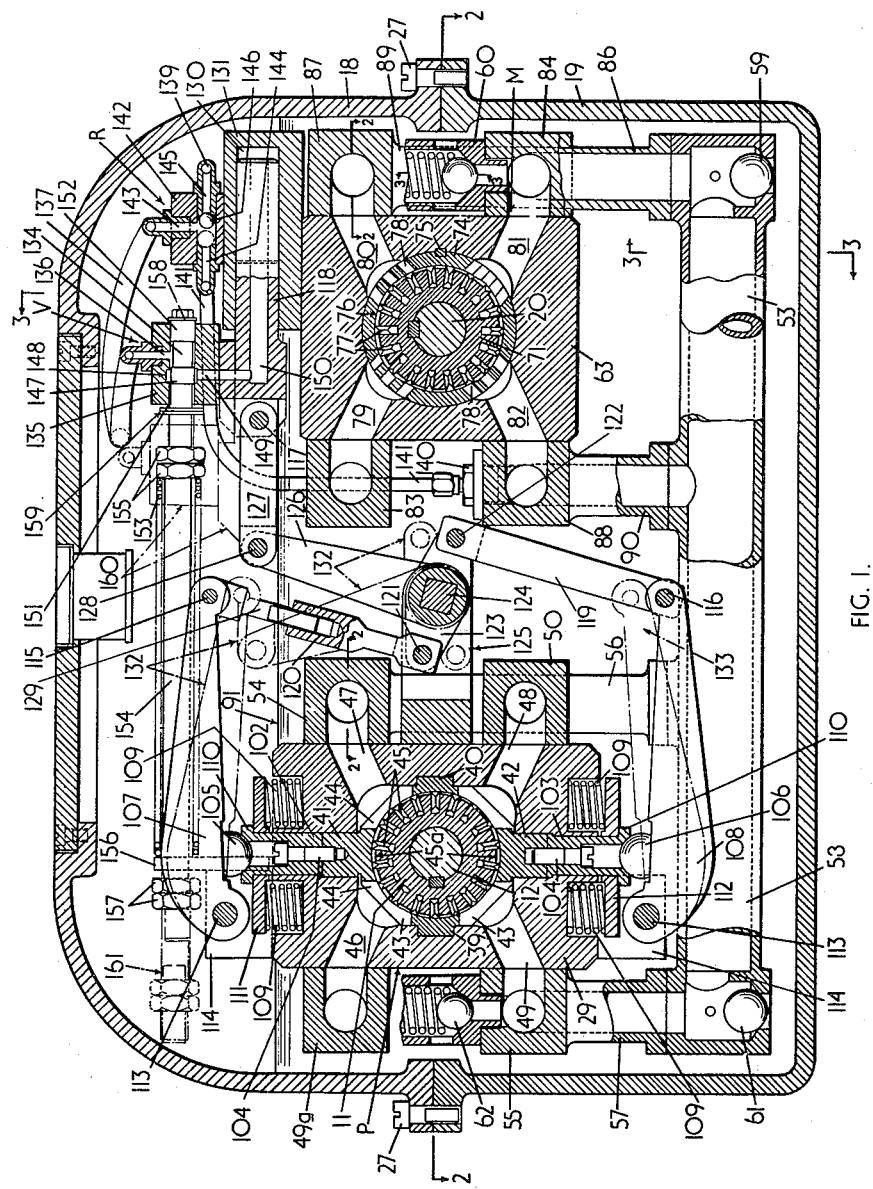
FIGURE 1 is a vertical section along irregular line 1—1 of FIGURE 2.

The reversible hydrostatic torque converter as shown in the drawings comprises a balanced vane type hydraulic pump P of adjustable displacement. Rotor 11 of the pump is keyed on shaft 12 and driven by a squirrel cage electric motor 13 by means of a gear 14 keyed on the shaft 10 of the motor and a gear 15 splined on the pump shaft 12. The motor 13 is attached by flange 16 and screws 17 to both the top half 18 and bottom half 19 of a casing which houses the torque converter, the two halves being bolted together by means of bolts 27 and dowel pins 28 thus forming an oil tight enclosure.

The enclosure also contains a balanced-vane type hydraulic motor M.

From shaft 20 of the hydraulic motor an output shaft 21 is driven by a pair of gears 22 and 23.

The torque converter as a unit is attached to flange 24 of a driven machine 25 by means of screws 26.

The pump P comprises a stator 29 to which two end covers 30 and 31 (FIGURE 2) with oil retaining diaphragms 32 and 33 are bolted by means of bolts 34.

The covers 30 and 31 are provided with roller bearings 35 and 36 in which the shaft 12 is journaled. The covers 30 and 31 are provided with cylindrical portions or spigots 37 and 38 for mounting by clamping between the two halves 18 and 19 of the casing.

The pump stator 29 is provided with two fixed inserts 39 and 40 (FIGURE 1) and two slidably fitted separators 41 and 42.

Projections 43 of the inserts 39 and 40 overlap projections 44 of the separators 41 and 42 forming thus a continuous guide way or track of an oval shape for the spring loaded double vanes 45. The extent of projection of the vanes 45 and the displacement of the pump can be adjusted by sliding the separators 41 and 42 radially in relation to the rotor 11.

There are provided four bores 46, 47, 48 and 49 in the pump stator 29.

Two bores 46 and 48 (situated diametrally opposite to each other) are connected together through flanges 49a and 50 and vertical pipes 51 and 52 (FIGURE 2) and lead into the horizontal pipe 53.

Two other bores 47 and 49 (again situated diametrally opposite to each other) are connected together through flanges 54 and 55 and vertical pipes 56 and 57 and lead into the second horizontal pipe 58.

Pipe 53 is provided with two suction valves 59 (one at each end of the pipe) of a free seated ball type and one relief valve 60 of a spring loaded ball type.

Figure 2:
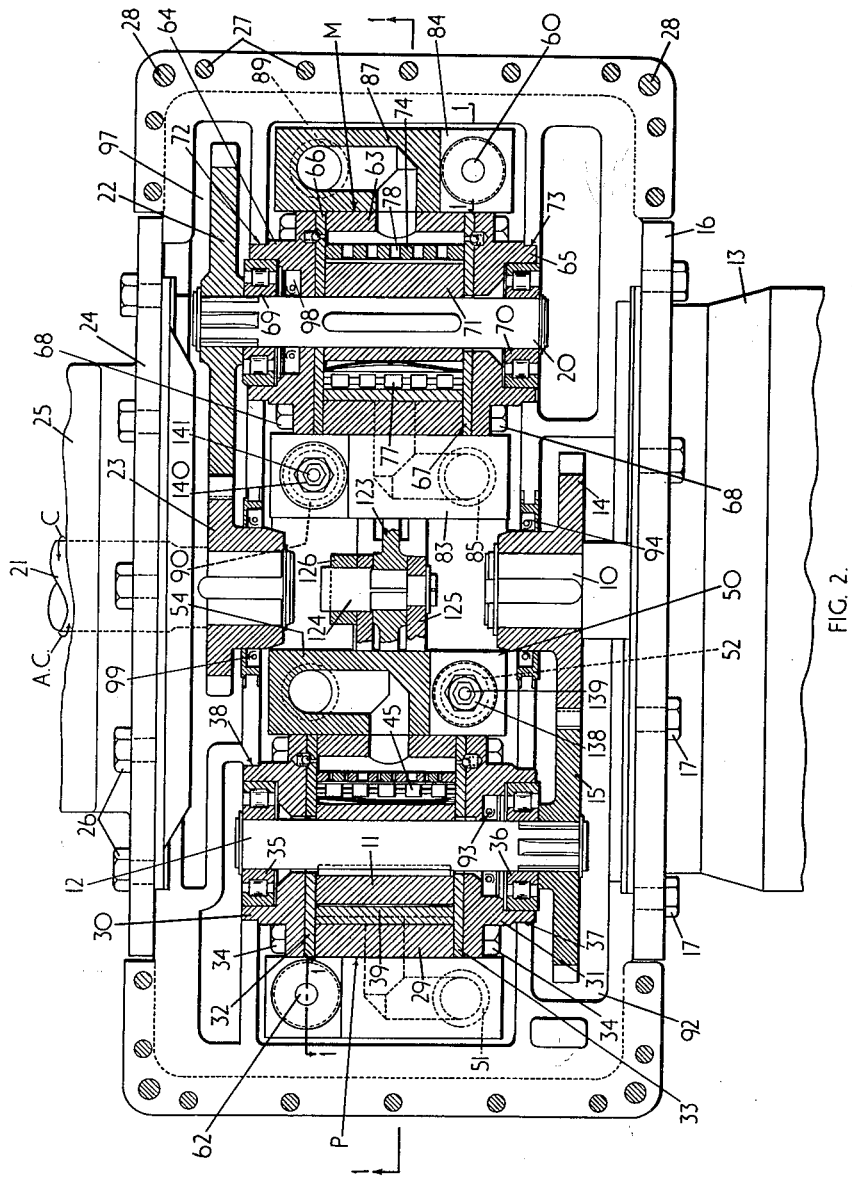
FIGURE 2 is a plan view with horizontal section 2—2 of FIGURE 1.

Similarly pipe 58 is provided with two suction valves 61 and one relief valve 62 (FIGURE 1 and FIGURE 2).

The hydraulic motor M is of a similar construction to the pump P but is of constant displacement.

The motor M comprises a stator 63 with two end covers 64 and 65 provided with two oil retaining diaphragms 66 and 67 bolted together to the stator 63 by means of bolts 68. Roller bearings 69 and 70 are provided in the end covers to journal the shaft 20 which has a keyed rotor 71. The motor is mounted between the casing halves 18 and 19 by two spigot portions 72 and 73 in the same way as the pump P.

In a central bore of the stator 63 a liner bush 74 is tightly fitted and located by key 75. The bush 74 has an oval shaped inner surface 76 forming a guide way or track for spring loaded double vanes 77 arranged to perform outward and inward movements by following the profile of the liner 74. The liner 74 is provided with four sets of radial holes 78 to communicate with four bores 79, 80, 81 and 82 provided in the stator 63.

One pair of bores 79 and 81 (situated diametrally opposite to each other) are connected together by pipe 53 and flanges 83 and 84, and lead into vertical pipes 85 and 86 (FIGURE 1 and FIGURE 2). The second pair of bores 80 and 82 are connected together by the pipe 58 and flanges 87 and 88 and lead into vertical pipes 89 and 90.

The pump P and the motor M are thus connected together in a closed hydraulic circuit.

If for example, the pump P is rotated by the prime driver clockwise (looking on the splined end of the pump shaft with gear 15), oil under pressure will be delivered into bores 47 and 49 and through pipe 58 into bores 80 and 82 of the motor to rotate the motor shaft 20 anti-clockwise. If the direction of pump rotation is reversed to anti-clockwise, oil under pressure will be delivered into bores 46 and 48 and via pipe 53 into bores 79 and 81 of the motor to rotate the motor shaft 20 clockwise.

Any oil leakage from the closed hydraulic circuit in either pipe 53 or 58 will be made up through suction valves 59 or 61. Any over-pressure in the closed circuit will be relieved through either relief valve 60 or 62.

Figure 3:
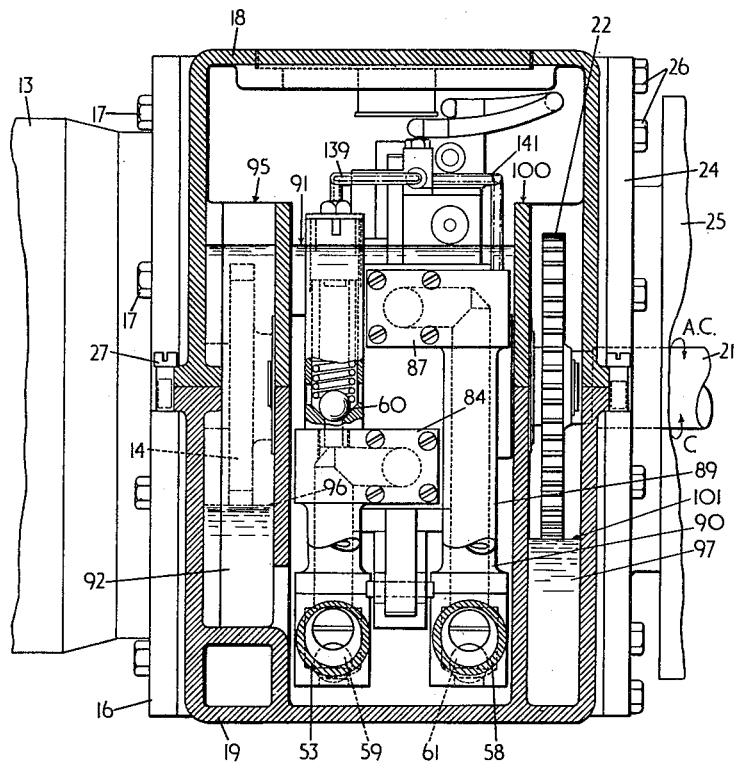
FIGURE 3 is a vertical cross section along irregular line 3—3 of FIGURE 1.

The pump P and the motor M, together with all the pipes, are immersed in oil having a high level 91 as shown in FIGURE 1 and FIGURE 3, to prevent any possibility of air penetrating into the closed circuit of oil and for efficient heat transfer from the oil inside the closed circuit to the outside oil.

There could be provided means for cooling the oil inside or outside the casing if desired.

To avoid churning and agitation of the oil by fast rotating gears with consequent aeration and emulsification, there is provided a separate compartment 92, protected by oil seals 93 and 94, and having high separating wall 95. The gears 14 and 15 are located in this compartment.

Any leakage of oil into the compartment causing a rise above the level 96 (FIGURE 3) will be caught by the periphery of the gear wheels and flung out of the compartment 92 over the wall 95.

The oil drops will, of course, provide lubrication for the gears.

Similarly, there is provided the second separate compartment 97, protected by oil seals 98 and 99 and high wall 100, in which the gear wheels 22 and 23 are housed.

The compartment 97 has a low oil level 101 just reaching the periphery of the larger wheel 22. The level of oil is kept constant by the flinging effect of wheel 22 as described above.

For adjustment of pump capacity the separators 41 and 42, as mentioned previously, can be slid radially by means of thrust rods 102 and 103 (FIGURE 1) screwed to the separators by screws 104 and provided at their outer ends with thrust balls 105 and 106 abutting by their flat surfaces on levers 107 and 108.

It may be understood now that both separators 41 and 42 are always forced to move outwards by the working pressure of the pump and by four compression springs 109 acting on shoulders 110 of the rods 102 and 103 by means of yoke members 111 and 112.

Each lever 107 and 108 is attached pivotally to the pump stator 29 by means of pivot pin 113 and bracket 114.

The free ends of the levers are provided with pins 115 and 116 and are connected to a pin 117 attached to a hydraulic ram 118 (FIGURE 1) through a linkage including two links 119 and 120 having pivot pins 121 and 122, a double arm lever 123 mounted on square portion of shaft 124 supported in bracket 125, a lever 126 integral with the shaft 24, a link 127 and a pivot pin 128.

The link 120 is provided with a threaded eyebolt 129 to allow compensation of its length.

When oil under pressure is admitted into space 130 of the hydraulic cylinder 131 fixed to the motor stator 63, the ram 118 will move out moving the link 127 and the whole lever system described above so as to force simultaneously both thrust rods 102 and 103 inwardly to reduce the amount of projection (FIGURE 1) of the vanes 45 from the rotor 11, and thus reduce the pump displacement. In the extreme inner position of the levers 107, 108 as shown by chain dotted lines 132, 133, the projection of vanes 45 reaches minimum and the pump capacity in this position will be equal to zero.

As the hydrualic motor M is of a constant displacement type and the transmission ratio between motor shaft 20 and output shaft 21 provided by gears 22 and 23 remains constant, pressure of working fluid in the hydraulic system is directly proportional to the torque or resistance at the output shaft 21. Thus the automatic adjustment of speed of the output shaft, in accordance with the pressure of hydraulic fluid in the system, will have the same effect as adjustment of the speed in accordance with the output torque or resistance of the shaft 21.

For automatic adjustment of the pump P capacity and thus the speed of output shaft 21 in accordance with the pressure of hydraulic fluid, a spring loaded "hunting" servo-valve V is provided.

Control piston 134 is slidably fitted in valve body 135 attached to the head of the piston 118.

Oil under pressure is admitted into bore 136 of the valve body through a flexible pipe 137 from either pipe 53 through connection 138 (FIGURE 2), pipe 139 (FIGURE 2 and FIGURE 3), and a rectifying valve R or from pipe 58 through second connection 140, pipe 141, and the same rectifying valve R.

The rectifying valve R comprises a body 142 with three bores 143, 144, and 145 into which lead pipes 137, 139 and 141 respectively. A free moving ball 146 provided between the two inlets of the rectifying valve will always move under pressure of oil so as to admit oil under pressure, either from pipe 139 or 141 into bore 143 and to close the second pipe 141 or 139 having low pressure, as the case may be. Thus the flow of oil is automatically rectified so that regardless of direction of the pump rotation, oil under working pressure will be admitted into bore 143 and the flexible pipe 137, and the low (suction) pressure will be isolated by the ball 146.

The piston 134 is provided with a portion 147 which is a close fit in the bore of the valve body 135 and which is slightly longer than the recess 148 in the valve body. When the piston 134 is moved to the left relatively to the valve body, oil is admitted to flow from bore 136 into space 130 via bores 149 and 150 so as to more the ram 118 to the left and thus reduce the pump P capacity and hence the speed of the output shaft 21.

When the piston 134 moves to the right the oil from space 130 will be allowed to escape freely outside via bores 150, 149 and opening 151, thus allowing the ram 118 to move under force of working pressure acting on the separators 41, 42 and springs 109 to the right, to increase the displacement of the pump P and the speed of the output shaft 21.

The piston 134 is provided with portion 152 having diameter slightly smaller than diameter of the portion 147. Therefore, the pressure admitted will create an axial force on the piston 134 acting to the left (in the direction of the larger diameter) and proportional to the pressure in bore 136 which is the working pressure in the hydraulic system.

This axial force is counteracted by a compression spring 153 mounted on a rod 154 which forms a continuation of the piston 134, and which is provided with nuts 155 to regulate the force of the spring. The second end of the spring 153 thrusts against a rigid vertical bracket 156 provided with a hole for the rod 154. There are provided nuts 157 to limit movement of the rod 154, and washers 158 and 159 are provided at each end of the piston 134 to limit its movement.

The differential area of portions 147 and 152 of the piston 134 and force of the spring 153 are such that compression of the pretensioned spring will start when pressure in the hydraulic system has reached a predetermined minimum and will be completed (position of the valve V and rod 154 as shown by chain dotted lines 160 and 161), when pressure has reached a predetermined maximum.

Between the two limits the exact position of the piston 134 and thus the position of the valve body 135, piston 118, separators 41, 42 and speed of output shaft 21 will be determined by pressure of working fluid or torque on the output shaft.

Figure 4:
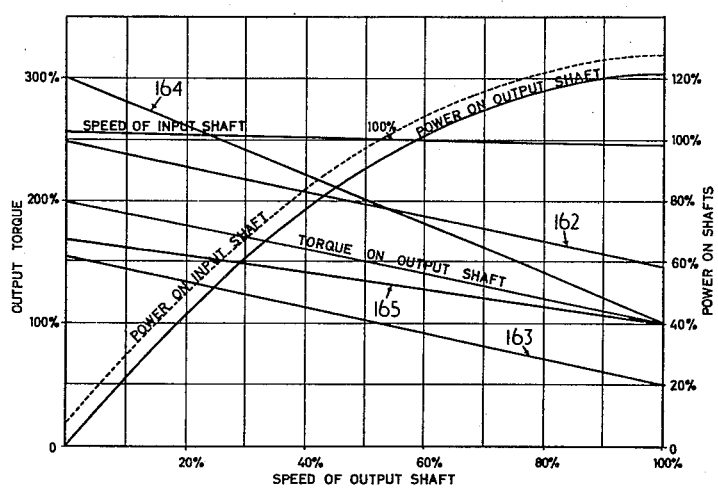
FIGURE 4 shows typical performance curves of a reversible hydrostatic torque converter.

The usual characteristics of a coil spring is straight linear, that is the deflection is in direct proportion to the acting force. By using the simple coil spring 153 change of output speed and that of output torque will be straight linear as shown in FIGURE 4. By adjusting the pretension of the spring 153 by means of nut 155, both minimum and maximum limits of output torque may be altered to a lower or a higher value as shown by lines 162 and 163 for example. By selecting a stiffer spring, the rate of the output torque multiplication can be increased. Alternatively, a softer spring will give a decreased rate of multiplication. Examples are shown by lines 164 and 165.

A spring of non-linear characteristic (for example parabolic) will provide non linear change of output speed and torque.

We claim:

1. In combination, a hydraulic motor having an output shaft; a motor-driven pump of the vane type and having a cam track adapted to co-operate with said vanes; hydraulically-actuated displacement adjustment means operatively connected to said pump, said adjustment means comprising a cylinder closed at one end and defining a cylindrical chamber, a piston slidably mounted in said chamber and connected by means of a mechanical linkage to means adapted to vary the profile of the said cam track to thereby vary the displacement of the said pump, whereby movement of the piston within said chamber controls the displacement of the said pump; first and second conduits connecting said pump to said motor to form a hydraulic circuit therewith, having high and low pressure sides whereby said motor can be energised by said pump when driven; a third conduit connecting said chamber to the high pressure side of said hydraulic circuit, servo valve means located in said third conduit and adapted to control the supply of liquid from the high pressure side of said hydraulic circuit to said chamber, said servo valve means being adapted to permit the flow of liquid to said chamber only when the pressure in the high pressure side of said hydraulic circuit exceeds a predetermined value, said flow of liquid being arranged to act on said piston which is thereby caused to slide axially within said chamber to progressively reduce the displacement of said pump, until said pressure attains a maximum value at which the displacement of the said pump is zero, whereby when the torque on the said output shaft is greater than a predetermined limit, the rotational speed of said output shaft varies inversely in accordance with the said torque.

2. The combination as claimed in claim 1, wherein the said servo valve means comprises a housing mounted on said piston for movement therewith, said housing defining an axial bore and inlet and outlet passages, in communication with said axial bore; said inlet passage being in communication with said hydraulic circuit and said piston defining a piston passage arranged to interconnect said outlet passage with said cylinder chamber; a valve piston slidably mounted in said axial bore and adapted to control the flow of liquid between said inlet and outlet passages; a compression spring operatively connected to said valve piston to urge said valve piston into its closed position in which flow between said inlet and outlet passages is prevented, said piston having a surface against which the pressure of liquid in the said inlet passage acts to urge the said valve piston into its open position in which said inlet passage is in communication with said outlet passage, in opposition to the force exerted by said compression spring.

3. In combination, a reversible hydraulic motor having an output shaft; a reversible motor-driven pump; first and second conduits connecting said pump to said motor to form a hydraulic circuit therewith having interexchangeable high pressure and low pressure sides whereby said motor can be energised by said pump when driven; flow rectifying valve means; third and fourth conduits connecting said rectifying valve means to both sides of said hydraulic circuit; hydraulically-actuated displacement adjustment means operatively connected to said pump; servo valve means; fifth and sixth conduits interconnecting said servo valve means and said adjustment means, and said servo valve means and said rectifying valve means respectively; said rectifying valve means being adapted to selectively place the said servo valve in communication with the side of the said hydraulic circuit which is for the time being the high pressure side, and to close communication between the said servo valve and the side of the said hydraulic circuit which is for the time being the low pressure side, said servo valve means being adapted to permit the flow of liquid to said adjustment means only when the pressure in the high pressure side of said hydraulic circuit exceeds a predetermined value, said adjustment means being adapted to progressively reduce the displacement of the said pump in response to said flow of liquid thereto, until said pressure attains a maximum value at which the displacement of said pump is zero, whereby, when the torque on the said output shaft is greater than a predetermined limit, the rotational speed of the said output shaft varies inversely in accordance with the said torque.

4. The combination as claimed in claim 3, wherein said flow rectifying valve means comprises a housing defining two inlet passages and an outlet passage, one of said inlet passages being connected to one side of said hydraulic circuit, and the other of said inlet passages being connected to the other side of said hydraulic circuit, and said outlet passage being connected to said servo valve means by the said sixth conduit; and a valve closure member located in said housing between said inlet passages and said outlet passage, and adapted to move selectively under the higher pressure in one of said inlet passages to close communication between the other said inlet passage and the outlet passage, whilst permitting communication between the said one of said inlet passage and the said outlet passage.

References Cited in the file of this patent

UNITED STATES PATENTS

| | | |
|---|---|---|
| 1,829,655 | Huguenin | Oct. 27, 1931 |
| 2,009,608 | Douglas | July 30, 1935 |
| 2,222,144 | Ferris | Nov. 19, 1940 |
| 2,238,060 | Kendrick | Apr. 15, 1941 |
| 2,238,063 | Kendrick | Apr. 15, 1941 |
| 2,630,681 | Ferris | Mar. 10, 1953 |
| 2,963,866 | Bookout et al. | Dec. 13, 1960 |